United States Patent [19]

Beck

[11] 4,269,350
[45] May 26, 1981

[54] THERMOSTATIC FLUID VALVE WITH POWER ELEMENT EXTENSION AND METHOD OF CONSTRUCTING SAME

[75] Inventor: Mark E. Beck, Villa Park, Ill.

[73] Assignee: Eaton Corporation, Cleveland, Ohio

[21] Appl. No.: 927,254

[22] Filed: Jul. 24, 1978

[51] Int. Cl.³ .............................................. G05D 23/12
[52] U.S. Cl. ...................... 236/34.5; 29/509; 29/522 R
[58] Field of Search ................ 236/34, 34.5, 100; 29/509, 453, 522 R; 251/337

[56] References Cited

U.S. PATENT DOCUMENTS

| | | | |
|---|---|---|---|
| 2,470,667 | 5/1949 | Warrick et al. | 236/34.5 X |
| 2,725,076 | 11/1955 | Hansen et al. | 251/337 X |
| 3,058,211 | 10/1962 | Axtell | 29/522 X |
| 3,172,602 | 3/1965 | Drapeau | 236/34.5 |
| 3,220,753 | 11/1965 | Kasidas | 29/509 X |
| 3,301,433 | 1/1967 | Wade | 29/522 X |
| 3,365,130 | 1/1968 | Kamin et al. | 236/34.5 |
| 3,561,102 | 2/1971 | Diemer | 29/522 X |
| 3,817,450 | 6/1974 | Mischke | 236/34.5 |
| 3,858,800 | 1/1975 | Wong | 236/34.5 |

*Primary Examiner*—William E. Tapolcai, Jr.
*Attorney, Agent, or Firm*—R. J. McCloskey; E. C. Crist; R. A. Johnston

[57] ABSTRACT

A thermostatic fluid valve of the type having a temperature responsive power element mounted between upper and lower housing members. A tubular extension member is attached to the lower end of the power element and permits a spring biased valve member to be mounted thereon. The tubular extension member has an inwardly extending flange formed on the upper end and is received over a cylindrically shaped, cold formed boss projecting from the lower end of the power element. The extension member is retained on the lower end of the power element by orbitally staking the boss radially outward to form a cold worked, high strength retaining flange.

5 Claims, 4 Drawing Figures

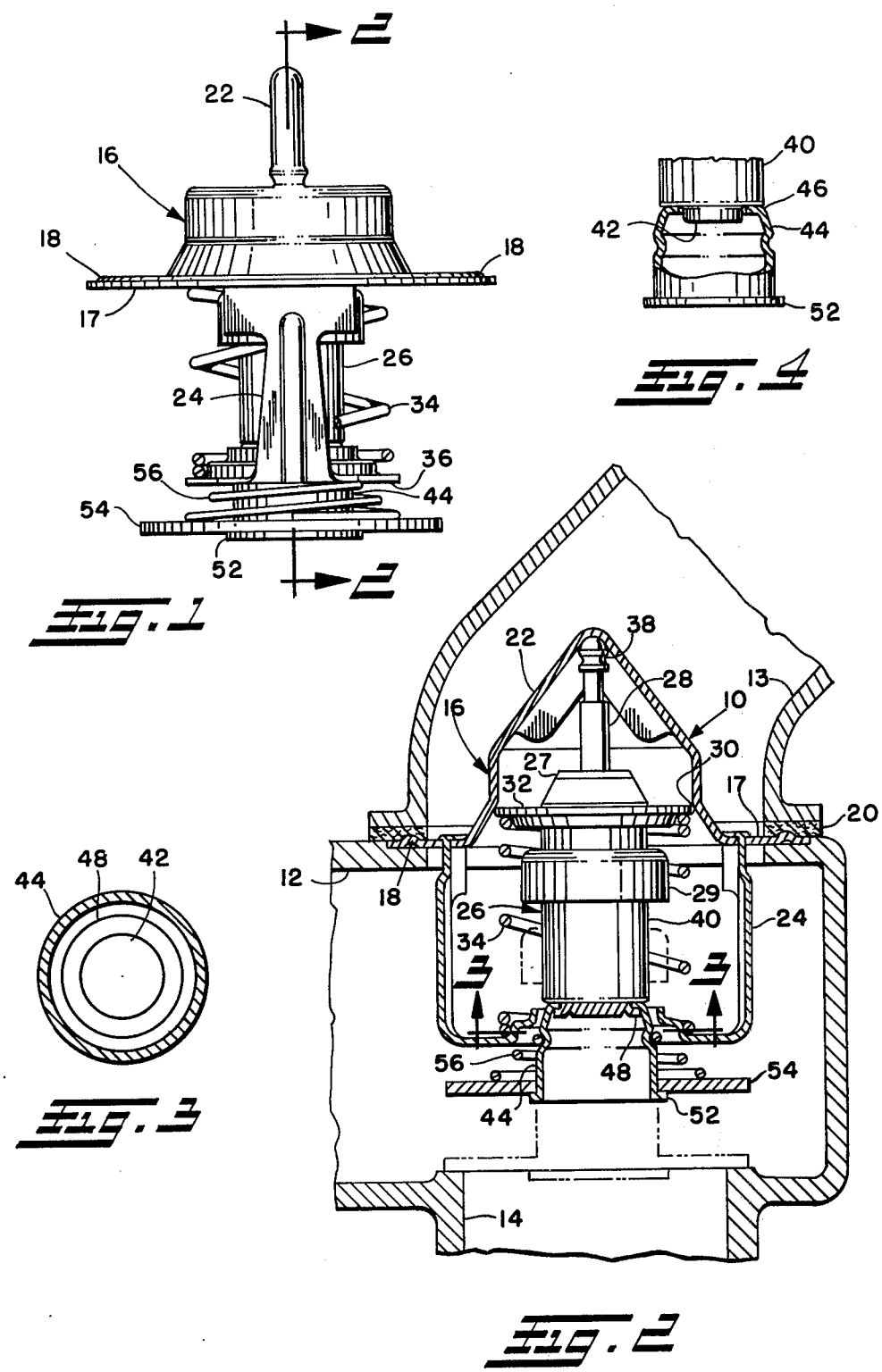

THERMOSTATIC FLUID VALVE WITH POWER ELEMENT EXTENSION AND METHOD OF CONSTRUCTING SAME

BACKGROUND OF THE INVENTION

This invention relates to thermostatic water valves for use in internal combustion engine cooling systems and particularly to valves of the type having a bypass valve member mounted on an extension member projecting from the bottom end of the valve power element and includes a method of constructing same.

DESCRIPTION OF THE PRIOR ART

During operation of a cold engine it is desirable to prevent cooling water from flowing through the radiator in order to reduce the time required for the engine to reach an optimal running temperature. As is well known in the art, this is commonly achieved by diverting cooling water from the discharge side of the water pump back to the engine block through a bypass conduit and blocking its return path to the radiator.

Thermostatic water valves are commonly constructed so as to have a bypass valve member extending from the lower housing member of the valve and often utilize a solid, cylindrical extension member welded to the bottom end of a temperature responsive power element. This type of construction requires costly fixturing for the welding operation to achieve high volume production, and also results in the likelihood of damage to the filled wax expansion material from exposure to excessive temperatures. A further cost disadvantage associated with valves of this construction is that a substantially solid extension member is needed for a reliable weld, thus dictating material usage beyond the needs of strength.

SUMMARY OF THE INVENTION

In the present invention a thermostatic water valve is provided of the type having a spring loaded bypass valve member with the bypass valve mounted on a unique, low cost extension member. The invention includes a method for attaching the extension member to the power element. The extension member is tubular and has an inwardly turned flange around its upper end which is secured to the lower end of the temperature responsive power element. A unique aspect of the invention employs orbital staking of an axially extending boss formed on the lower end of the temperature responsive power element so as to deform the boss radially outward thereby providing a cold formed retaining flange which radially and axially retains the tubular extension member to the lower end of the temperature responsive actuator. Material costs are reduced by replacing a solid extension member with one of tubular configuration while assembly costs are reduced by eliminating the costly fixturing required for a weldment.

A further advantage provided by the invention is the relatively high pull-off strength achievable with cold deformation of the metal from the orbital staking since metal is formed with a minimum amount of work-hardening throughout a continuous 360 degree path.

Another feature of the invention is that the extension member is fastened to the wax-filled power element without deforming the body thereof and consequent disruption of the volumetric calibration thereof.

BRIEF DESCRIPTION OF THE DRAWINGS

FIG. 1 is a side elevation view of the invention; FIG. 2 is a cross-sectional view taken along section lines 2—2 of FIG. 1 showing the invention mounted in cooling water conduits of an internal combustion engine;

FIG. 3 is a partial cross-sectional view taken along section lines 3—3 of FIG. 2 showing an end view of the extension member; and FIG. 4 is a partial cross-sectional view of the extension member before orbital staking.

DETAILED DESCRIPTION

Referring now to FIGS. 1 and 2, there is indicated generally by reference numeral 10 a thermostatic fluid valve mounted in an engine cooling conduit 12 which leads into a hose fitting 13 which in turn flows to the engine radiator, not shown. Communicating with cooling conduit 12 is a bypass cooling conduit 14, the function of which will be described in detail below.

The thermostatic valve includes an upper housing section indicated generally by reference numeral 16 and has a flanged section 17 with a peripheral rib 18 for insuring fluid tight connection with a sealing gasket 20 clamped between hose fitting 13 and cooling conduit 12. An upper yoke section 22 is integrally formed by the upper housing section 16. A lower housing section 24 is connected to flange section 17 by any suitable means as, for example, riveted tabs, not shown, which may extend through flanged section 17. As shown in FIG. 2, a temperature responsive power element 26 is provided, preferably of the well-known wax filled type which expands upon increases in temperature with an abrupt increase in expansion as temperatures are sensed above a predetermined critical temperature. The power element 26 includes a guide section 27, an actuator member 28, and a retaining collar 29. The lower end of actuator 28 abuts a sealing diaphragm, not shown, which retains the wax base material within the power element. Expansion of the wax filled material is effective to move the diaphragm upward thereby extending actuator member 28 outward axially relative to the lower end of power element 26.

An inner valve seat 30 is defined by the inner annular surface of upper housing section 16. A disk shaped valve member 32 is attached to power element 26 near its upper end and is movable therewith. A compression spring 34 has its upper end in engagement with valve member 32 and its lower end reacting against a flange portion 36 of lower housing section 24 to bias the valve member 32 upwardly. The upper end 38 of actuator 28 with reference to FIG. 2 is grooved and captured between crimped sides of upper yoke 22. As can be seen in FIG. 1, upper housing section 16 and lower housing section 24 are framelike members which permit free fluid flow therethrough upon unseating of valve member 32 from valve seat 30, as will be described in greater detail below.

Referring to FIG. 2, the lower end of power element 26 includes a cup shaped member 40 which is formed by cold heading from a suitable brass material, preferably an alloy of 87% copper and 13% zinc. The member 40 has provided thereon a cold formed cylindrically shaped boss 42 extending from its lower end, as shown in FIG. 4. The cold heading process inparts residual stresses into cup shaped member 40 which has the effect of sufficiently work hardening the material, thereby raising its effective yield stress. Advantage is taken of the cold headed state of the boss whereby a tubular extension member 44, having an inwardly turned flange 46 around its upper end, is connected to the lower end of power element 26 by radially outward deformation of the boss thereover by an orbital staking process. This unique attachment provides a significantly high pull-off force in the range of about 500 lbs., given a boss 42 diameter of approximately 0.375 in. (9.52 mm) and a tubular extension member 44 wall thickness of about 0.020 in. (5.08 mm) with the tubular extension being formed of a suitable stainless steel. In the presently preferred practice the inwardly turned flanged end of tubular extension 44 is first positioned over boss 42 and then the orbital staking tool (not shown) is rotated and advanced against the transverse face of boss 42 resulting in the formation of a retaining flange 48, as shown by FIG. 2.

As illustrated in FIG. 3, the orbital staking process cold forms metal outward radially to form retaining flange 48 in a continuous 360° path without work hardening the material to a brittle condition, thereby resulting in a mechanical connection having the pull-off strength described above.

The axial force required to be applied to the spinning tool is relatively low compared to the axial force which would be required if the boss were riveted over flange 46. Another unique aspect of orbital staking which has been found particularly desirable is that the material of flanged portion 48 which is cold formed by this process, retains substantially the physical properties of the material before orbital staking. Therefore, the relatively high yield strength imparted to the cylindrical boss 42 during its formation by cold heading is maintained in the retaining flange 48 after assembly, thereby contributing to the high pull-off strength. Another benefit achieved by orbitally staking the extension member 44 to the lower end of the power element 26 is that the volumetric calibration of the wax filled material as contained in a calibrated volume within cup shaped member 40 remains substantially undisturbed since the magnitude of the axial tool force applied to the bottom face of cup 40 is sufficiently low enough to avoid deforming the cup walls.

As illustrated in FIG. 2, tubular extension 44 includes an annular groove 50 formed adjacent its upper end and an outwardly extending retaining flange 52 formed around its lower end. A bypass valve member 54 is slidably received on tubular extension 44 and is maintained in abutment against retaining flange 52 by a preferably conical biasing spring 56 which has its upper end seated in annular groove 50 and its lower end abutting against the top surface of bypass valve member 54.

A novel method of assembling power element 26 to tubular extension member 44 comprises the steps of first cold heading cup 40 from a suitable brass material, filling the cup with a predetermined volume of expansible wax base material, sealing the wax base material with a diaphragm, inserting actuator 28 within guide section 27, and attaching retaining collar 29 over guide 27, actuator 28, and the upper end of cup 40. The power element is preferably calibrated by heating to the critical temperature, limiting axial movement of actuator 28 to the required amount, and crimping the side wall of cup 40 until the wax material completely fills the volume defined by the cup and diaphragm. The tubular extension member 44 having annular groove 50 and inwardly turned flange 46 formed thereon is then placed over cylindrical boss 42 of the calibrated power element and secured to the power element 26 by orbitally staking as described above. This particular method provides an exceptionally strong, vibration resistant connection which insures a reliable support for bypass valve member 54.

In operation, during engine start up with the engine block cold, or at substantially ambient temperature, the temperature responsive power element 26 will remain in its unactuated or first position as illustrated in solid outline in FIG. 2. During cold engine operation, valve member 32 remains seated against inner valve seat 30, thereby blocking coolant flow from conduit 12 to the engine radiator. However, as the engine block temperature increases and the coolant temperature is raised above the critical temperature necessary to actuate power element 26, the power element 26 will expand resulting in downward movement with respect to FIG. 2 to a second valve position illustrated in dashed outline with a force sufficient to overcome biasing spring 34. The downward axial displacement of power element 26 is effective to position bypass valve member 54 in sealing abutment with the opening of bypass fluid conduit 14, as indicated by the dashed lines of FIG. 2. Conical biasing spring 56 maintains valve member 54 seated against the opening of bypass conduit 14 as power element 26 continues to expand in response to coolant temperatures above the critical temperature. Tubular extension 44 is free to slide through the centrally located opening in bypass valve member 54 thus preventing damage to the thermostatic valve structure. During normal engine operation, while the power element is actuated to its second position, valve member 32 is spaced downward from inner valve seat 30 thus permitting fluid flow from conduit 12 through the passageways in the valve, hose fitting 13, followed by flow to the engine radiator.

While the invention has been disclosed by reference to certain preferred embodiments, it should be understood that numerous changes could be made without departing from the scope of the inventive concepts disclosed. Accordingly, it is intended that the invention not be limited, except by the language of the following claims.

What is claimed is:

1. A temperature responsive fluid valve mountable in an engine cooling system, said valve comprising:
   (a) upper housing means having a fluid passageway therethrough, said upper housing means defining an annular valve seat on the inner surface thereof;
   (b) lower housing means connected to said upper housing means, said lower housing means having a centrally located opening therethrough, said lower housing means having a fluid passageway therethrough;
   (c) temperature responsive means having its upper end abutting said upper housing means, and its lower end aligned with said opening;
   (d) first valve means mounted on said temperature responsive means and movable therewith;
   (e) first biasing means for urging said first valve member toward said first valve seat;
   (f) extension means projecting from the lower end of said temperature responsive means and axially aligned therewith, said extension means including an elongated tubular member with the upper end thereof having an inwardly turned flanged portion;
   (g) means for connecting said inwardly turned flange to the lower end of said temperature responsive means, said connecting means comprising a substantially solid boss located on the lower end of said temperature responsive means, said boss having deformed portions overlapping and axially compressing said inwardly flanged portion of said tubular member against the lower end of said temperature responsive means;

(h) second valve means received on said tubular member and movable therewith; and (i) said temperature responsive means movable in response to sensed fluid temperature above a predetermined minimum value between a first position in which said first valve member seals against said first valve seat for blocking fluid flow through said valve, and a second position in which said first valve member is spaced from said first valve seat for permitting fluid flow through said valve.

2. The device as defined in claim 1, wherein
 (a) said boss is formed by cold heading; and
 (b) said retaining flange is cold formed uniformly in a continuous circumferential pattern such that the mechanical properties of said retaining flange are substantially equivalent to the mechanical properties of said boss before cold forming.

3. The device as defined in claim 1, wherein said retaining flange extends radially outward for securing said tubular member against transverse radial movement relative to said temperature responsive means.

4. The device as defined in claim 1, wherein,
 (a) said tubular member includes an annular groove formed therein adjacent the upper end thereof and a retaining means integrally formed around the lower end thereof;
 (b) said second valve means is slidably received on said tubular member; and further including,
 (c) second biasing means received over said tubular member, said second biasing means including a conical spring with the upper end thereof seated in said annular groove and the lower end thereof urging said second valve means against said retaining means.

5. A thermally responsive valve comprising:

(a) upper housing means defining a fluid passageway therethrough;

(b) lower housing means connected to said upper housing means and having a fluid port therethrough;

(c) first valve means within said upper housing fluid passage and including a valve member movable between a plurality of first positions permitting and a second position preventing fluid flow through said passage;

(d) thermally responsive means within said upper and lower housing means and operable to move said first valve member between said first and second positions at a predetermined temperature;

(e) extension means connected to said thermally responsive means, said extension means including an elongated tubular member with one end thereof having an inwardly extending flange about the periphery thereof, said tubular member having a retaining portion integrally formed about the other end thereof, said tubular member being disposed for movement through said fluid port in said lower housing;

(f) second valve means, including a second valve member resiliently retained on said tubular member, said temperature responsive means being operable to move said tubular member in response to experiencing fluid temperatures above a predetermined level; and (g) said thermally responsive means includes a hollow body member having said hollow filled with solid material changeable to a liquid at said predetermined temperature level and having a solid projecting portion extending from the outer surface thereof with said inwardly extending flange of said tubular member received thereover and retained thereon by a radially deformed outwardly extending flanged portion of said projecting portion, said flanged portion overlapping and axially compressing said tubular member flange against the lower end of said thermally responsive means for connecting said tubular member to said thermally responsive means.

* * * * *